(12) United States Patent
Park et al.

(10) Patent No.: US 10,785,264 B2
(45) Date of Patent: Sep. 22, 2020

(54) SYSTEM AND METHOD FOR SECURITY INSPECTION OF ELECTRONIC EQUIPMENT

(71) Applicants: Hyundai Motor Company, Seoul (KR); Kia Motors Corporation, Seoul (KR)

(72) Inventors: Jun Yeon Park, Uiwang-si (KR); Changmo Yang, Chungju-si (KR); Jin Seok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 213 days.

(21) Appl. No.: 16/176,447

(22) Filed: Oct. 31, 2018

(65) Prior Publication Data
US 2019/0268376 A1 Aug. 29, 2019

(30) Foreign Application Priority Data
Feb. 27, 2018 (KR) .......................... 10-2018-0023904

(51) Int. Cl.
*H04L 29/06* (2006.01)
*H04L 9/08* (2006.01)
(Continued)

(52) U.S. Cl.
CPC ............ *H04L 63/20* (2013.01); *G06F 21/577* (2013.01); *H04L 9/08* (2013.01); *H04L 63/02* (2013.01); *H04L 63/0428* (2013.01); *G06F 8/65* (2013.01); *G06F 2221/034* (2013.01); *H04W 4/40* (2018.02); *H04W 4/80* (2018.02)

(58) Field of Classification Search
None
See application file for complete search history.

(56) References Cited

U.S. PATENT DOCUMENTS

2016/0203067 A1* 7/2016 Marko ................ G06F 11/2268
                                                                    714/37
2016/0335414 A1* 11/2016 Isaacs ..................... G16H 20/10
2018/0063102 A1* 3/2018 Secatch ................ H04L 9/0891

FOREIGN PATENT DOCUMENTS

KR        10-1472896 B1    12/2014
KR        10-1673310 B1    11/2016

* cited by examiner

Primary Examiner — Andrew J Steinle
(74) Attorney, Agent, or Firm — Morgan, Lewis & Bockius LLP (57) ABSTRACT

A security inspection system verifying a security system of electronic equipment may include an inspector having: a communicator connecting wireless diagnostic communication with the electronic equipment entering a process line; a KMS inspection portion inspecting a management state of generation and destruction of encryption key of a key management system device included in the electronic equipment; an application firewall inspection portion inspecting security policy of an application firewall disposed in a gateway of the electronic equipment; a version inspection portion updating at least one of a patch program and a firmware of the security system included in the electronic equipment; a database storing a program and data for a security inspection of the electronic equipment; and a controller performing diagnostic test of a firewall installation state, an encryption key management state, a transmission/reception state of an encrypted message, or blocking of abnormal data of the security system.

19 Claims, 8 Drawing Sheets

(51) Int. Cl.
*G06F 21/57* (2013.01)
*H04W 4/40* (2018.01)
*G06F 8/65* (2018.01)
*H04W 4/80* (2018.01)

| Type | Classification | Inspection object |
|---|---|---|
| Direct Physical Attack | Network | Attack through OBD port, Smart key replication |
| | | IP-based network attack |
| | File System | Inspection of general purpose file system such as operating system (OS) |
| | File / Media | Inspection of usual attack against media file |
| Indirect Physical Attack | File / Media | Inspection of attack using firmware (FW) update of media player, Inspection of exploit attack using FW update through CD/Wifi |
| | | Attack using transmission of CAN packet by exploit parsed through audio file |
| | Application | Attack using design defect such as bug and security vulnerability |
| | | Attack using window media audio (WMA) parser vulnerability |
| Local / Remote Wireless Attack | Application | Attack using vulnerability in Bluetooth protocol stack code |
| | Network | Attack using malicious code inserted in communication function |
| | | Attack against communication channel between telematics module and smart phone |
| | | Attack using exploit in manufacturer command program |

SYSTEM AND METHOD FOR SECURITY INSPECTION OF ELECTRONIC EQUIPMENT

CROSS-REFERENCE TO RELATED APPLICATION

The present application claims priority to Korean Patent Application No 10-2018-0023904 filed on Feb. 27, 2018, the entire contents of which is incorporated herein for all purposes by this reference.

BACKGROUND OF THE INVENTION

Field of the Invention

The present invention relates to a system and a method for inspecting security of an electronic device, and more particularly, to a system and a method for security inspection of electronic equipment for verifying performance of a security system applied to prevent hacking of the electronic equipment when the electronic equipment is made in a factory.

Description of Related Art

As information and communication technologies are developed, a variety of electronic devices provided with wired/wireless communication functions are being developed, and attention is focused on security issues due to their communication functions.

A vehicle is provided with a large number of electronic control units (ECUs) such as an audio video navigation (AVN) device which is a multimedia device. Furthermore, mechanical devices such as engines, brakes, lamps, and driving control devices for the vehicle are becoming electronic.

As research on convenience, safety, and economy of a vehicle and research on an environmentally-friendly vehicle has been continued, communication technology has been developed, and advanced information Technology (IT) technology has been converged, a smart vehicle and a connected vehicle are being developed in vehicle industry.

A vehicle may include dozens of computers and software which is written in hundreds of millions of lines of code, and it performs both wired and wireless communication through an external network as well as an internal network.

However, as combination of a vehicle and IT technology is rapidly proceeding and inter-vehicle communication and close connection between the vehicle and the external network increase, there is a problem that a scope of a hacking attack is increased.

For example, as the number of advanced driver assistance systems (ADAS) and autonomous vehicles has increased, the number of potential infiltration points has increased exponentially as a result of connection to the Internet, other vehicles, and road infrastructure.

However, it is difficult to prevent hacking into a vehicle by simply using a security enhancement technique based on controller area network (CAN) message monitoring.

For example, there has been a case in which a transmission, a door lock/unlock, a cluster, and the like are controlled by hacking an in-vehicle communication system remotely.

Also, a hacker has remotely hacked and controlled the Jeep Cherokee.

Manufacturers are studying to prevent damages caused by hacking, and security technologies are being applied to the vehicle or the application range is expected to increase gradually.

However, there is a problem that it is difficult to verify performance and quality of the security technologies because a factory for mass production of the vehicle does not have a process for inspecting various security technologies applied to the vehicle currently and applied to the vehicle in the future.

Therefore, there may be a demand for a security inspection method that inspects the security technologies applied in a manufacturing step of an electronized vehicle and verifies its performance and quality.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a method for security inspection of electronic equipment (e.g., a vehicle) verifying security quality of a security system applied for preventing hacking using performance test of the security system when the electronic equipment is made in a factory.

An exemplary embodiment of the present invention may provide the security inspection system that verifies security performance of a security system applied to electronic equipment including an inspector. The inspector may include: a communicator configured to connect wireless diagnostic communication with the electronic equipment entered into a process line; a key management system inspection portion configured to inspect a management state of generation and destruction of encryption key of a key management system device included in the electronic equipment; an application firewall inspection portion configured to inspect security policy of an application firewall disposed in a gateway of the electronic equipment; a version inspection portion configured to update at least one of a patch program and a firmware of the security system included in the electronic equipment; a database configured to store a program and data for a security inspection of the electronic equipment; and a controller configured to control an overall operation of the communicator, the key management system inspection portion, the application firewall inspection portion, the version inspection portion, and the database so that the controller performs at least one diagnostic test of a firewall installation state, an encryption key management state, a transmission/reception state of an encrypted message, and blocking of abnormal data of the security system included in the electronic equipment.

The electronic equipment may include a vehicle to which the security system is applied. The vehicle may include: a first communication module configured to connect wireless communication between the inspector and a vehicle head device via an external network; a second communication module configured to connect short-range wireless communication with the inspector using an on-board diagnostic system; an external gateway including the application firewall and configured to transmit and receive data through the first communication module and the second communication module; an internal gateway including the application firewall and configured to transfer information transmitted from the external gateway to electronic control devices connected to an internal network of the vehicle; an encryption module configured to encrypt data transmitted and received between the electronic control devices in the internal network; and the key management system device configured to define rule for encrypting and decrypting the data transmitted and received between the electronic control devices and to manage generation and destruction of the encryption key for communication between the electronic control devices.

The communicator may include: a first wireless communication portion configured to connect first diagnostic communication with a vehicle which is the electronic equipment via an external network; and a second wireless communication portion configured to connect second diagnostic communication with an on-board diagnostic device of the vehicle.

The inspector may further include: a vehicle-to-everything inspection portion configured to inspect a state of encryption of a test message for a vehicle-to-everything device of the vehicle through the first diagnostic communication; and a fuzz inspection portion configured to monitor an operation state of the vehicle-to-everything device by transmitting random abnormal data to the vehicle through the first diagnostic communication.

The vehicle-to-everything inspection portion may analyze the test message to diagnose an error which is wrongly translated into abnormal data during encryption or decryption.

The application firewall inspection portion may inspect whether a link between the application firewall and the gateway is normally performed.

The database may register and may manage coverage of the security system according to the vehicle type, link information between the application firewall and the gateway, encryption rule information and environment setting information related to the key management system device, and firmware version information related to an electronic control device of the vehicle.

The controller may be configured to determine that the encryption key management state is normal when the controller receives an encryption key generation and destruction response message of the key management system device from the electronic equipment in a response to a request for the encryption key generation and destruction performed by the controller.

The controller may be configured to determine that a malicious code included in the abnormal data is normally blocked when the controller receives a response message indicating that the malicious code is normally blocked after transmitting a hacking command instructing forced installation of the malicious code in an application of the vehicle-to-everything device.

When any one of inspection of the vehicle security system fails to verify security, the controller may analyze failed log information to diagnose a cause of the security verification failure.

An exemplary embodiment of the present invention may provide the security inspection method of an inspector that verifies security performance of a security system applied to electronic equipment, including: a) recognizing, by the inspector, the electronic equipment entering a security inspection process line and connecting wireless diagnostic communication with the electronic equipment; b) diagnosing, by the inspector, performance of the security system of the electronic equipment by inspecting at least one of a firewall installation state, an encryption key management state, a transmission/reception state of an encrypted message, and blocking of abnormal data of the electronic equipment through the wireless diagnostic communication; c) confirming, by the inspector, a version of a security patch and a firmware of the security system and updating to a latest version; and d) when any one of the inspection fails in security verification, storing, by the inspector, the verification failure log record and providing an alarm regarding the verification failure to an operator of the security system.

Step a) may include: connecting, by the inspector, first diagnostic communication with a vehicle which is the electronic equipment using a first wireless communication portion through an external network; and connecting, by the inspector, second diagnostic communication with an on-board diagnostic device mounted on the vehicle using a second wireless communication portion.

Step b) may include: inspecting, by the inspector, whether link information between a gateway and a firewall of a vehicle which is the electronic equipment is normally verified.

Step b) may further include: inspecting, by the inspector, whether security policy set in the firewall matches security policy of a database of the inspector according to the vehicle type and the security policy of the firewall is activated.

Step b) may further include: determining, by the inspector, that the encryption key management state is normal when the inspector receives an encryption key generation and destruction response message of the key management system device of the vehicle in a response to a request for the encryption key generation and destruction performed by the inspector.

Step b) may further include: verifying, by the inspector, whether at least one environment setting information among the key generation and destruction cycle, access control, and management authority of the key management system device matches the information related to a database of the inspector according to the vehicle type.

Step b) may further include: transmitting, by the inspector, a test message for a vehicle-to-everything device of the vehicle through second diagnostic communication connected to an external network; and analyzing, by the inspector, the test message of the vehicle-to-everything device to diagnose an error which is wrongly translated into abnormal data during encryption or decryption.

Step b) may further include: transmitting, by the inspector, abnormal data which is randomly generated through a random number combination through second diagnostic communication connected to an external network; and performing, by the inspector, a fuzz testing step of verifying whether a response message indicating that the abnormal data is normally blocked is received from the vehicle.

The fuzz testing step may include: transmitting, by the inspector, a hacking command instructing forced installation of a malicious code in an application of a vehicle-to-everything device of the vehicle; and determining, by the inspector, that the malicious code is normally blocked when the inspector receives a response message indicating that the malicious code is normally blocked.

The exemplary embodiment of the present invention, which is a security inspection system in the factory, may verify various security core technologies applied to or expected to be applied to the electronic equipment to improve reliability and safety of the electronic equipment.

The exemplary embodiment of the present invention may improve the security quality of the vehicle (e.g., a connected vehicle that utilizes various communication infrastructures) to cope with regulations regarding a vehicle security specification in a global market.

Furthermore, the exemplary embodiment of the present invention may reduce a replacement cost, a software improvement cost, and a firmware update cost of an electronic control unit (ECU), a key management system (KMS), an audio video navigation (AVN) device, etc. caused by a security problem of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. Furthermore, the terms "-er", "-or" and "module" described in the specification mean units for processing at least one function and operation and may be implemented by hardware components or software components and combinations thereof.

Throughout the specification, data transmitted and received outside and inside a vehicle are used in the same sense as packets and messages.

A system and a method for security inspection of electronic equipment according to an exemplary embodiment of the present invention will now be described in detail with reference to the drawings. However, they will be described assuming that the electronic equipment is a vehicle to which a security system is applied to prevent hacking.

Figure 1:
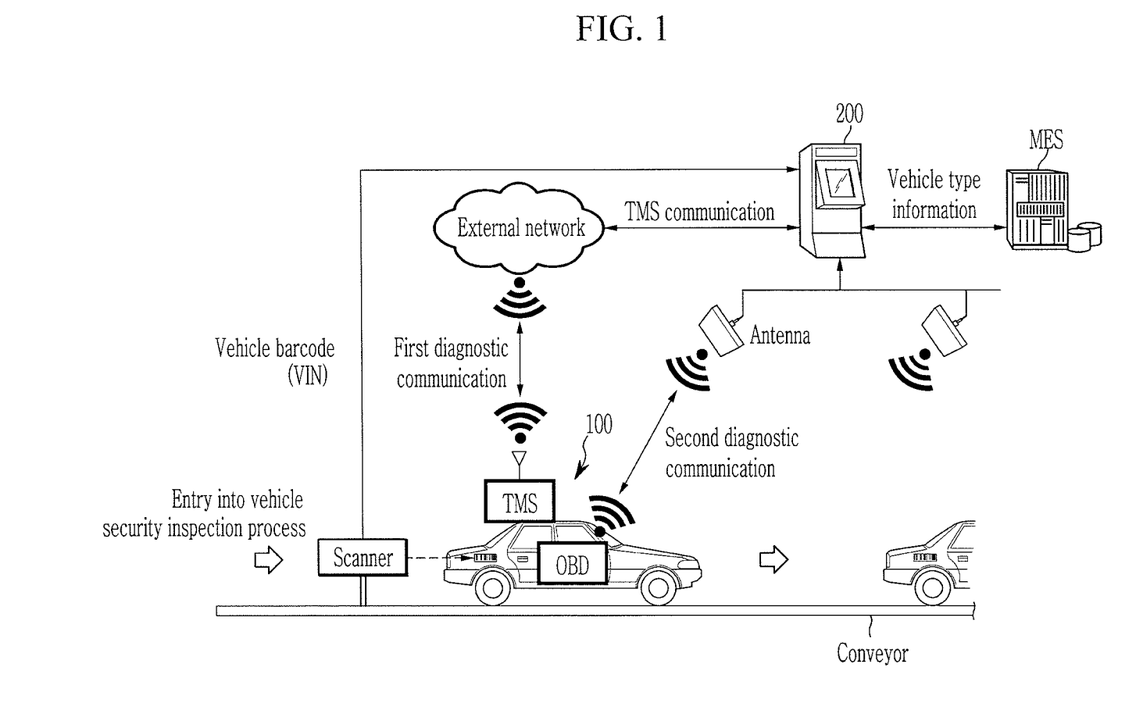
FIG. 1 schematically shows a configuration of a system for security inspection of a vehicle according to an exemplary embodiment of the present invention.

FIG. 1 schematically shows a configuration of a system for security inspection of the vehicle according to an exemplary embodiment of the present invention.

Referring to FIG. 1, the vehicle security inspection system may include a vehicle 100 to which a security system for communication is applied, and an inspector 200 which is disposed in a vehicle security inspection process and diagnoses performance of the security system.

The vehicle 100 may be assembled by moving along various production lines on a conveyor belt, and may enter into the vehicle security inspection process for performance inspection of a security configuration disposed in the vehicle.

The inspector 200 may test an operation state of the security configuration applied to the vehicle 100, which is assembled to enter the security inspection process, to inspect whether the security configuration is normal, and may diagnose an abnormal event due to security verification failure.

When the inspector 200 receives a vehicle identification number VIN detected by a scanner, it may recognize the vehicle entry.

When the inspector 200 recognizes entry of the vehicle, the inspector may inquire vehicle type information corresponding to the vehicle identification number of a manufacturing execution system (MES) (or a manufacturing execution system device), and may inquire identification (ID) of an on-board diagnostic system (OBD) or an on-board diagnostic device disposed in the vehicle 100 of the MES.

The inspector 200 may confirm or check a security specification applied to the vehicle based on the vehicle type information and may connect first diagnostic communication with the vehicle through an external network using telematics (TMS) communication.

The inspector 200 may connect second diagnostic communication with the OBD mounted on the vehicle based on the ID of the OBD. A transmission/reception antenna for connecting the second diagnostic communication may be disposed above the process line.

The inspector 200 may diagnose performance of the security system of the vehicle by inspecting at least one of a firewall installation state, an encryption key management state, a transmission/reception state of an encrypted message, and blocking of abnormal data of the vehicle through the connected diagnosis communication.

The inspector 200 may confirm a security configuration in a database (DB) applied according to a type of the vehicle, and may perform a suitability inspection of the security configuration applied to the vehicle type wirelessly through the first diagnostic communication and the second diagnostic communication.

Figure 2:
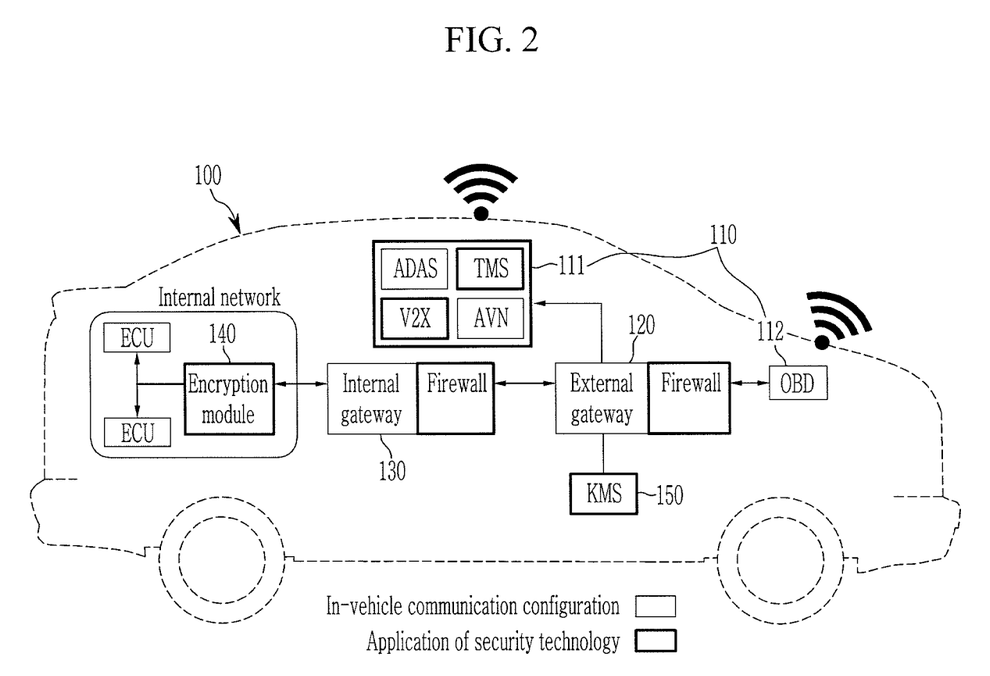
FIG. 2 is a block diagram schematically illustrating a vehicle security system according to an exemplary embodiment of the present invention.

FIG. 2 is a block diagram schematically illustrating a vehicle security system according to an exemplary embodiment of the present invention.

Referring to FIG. 2, the vehicle 100 may have a security system for secure communication and may include a vehicle communication module 110, an external gateway 120, an internal gateway 130, an encryption module 140, and a key management system (KMS) or a key management module 150.

The vehicle communication module 110 may include a first communication module (or a first communication device) 111 and a second communication module 112.

The first communication module 111 may communicate with the external network such as a telematics network to support communication for the vehicle head unit (or the vehicle head device). The vehicle head device may include an audio video navigation (AVN) device, a telematics unit (or a telematics device), and a vehicle-to-everything (V2X) device.

The AVN device may be a multimedia terminal or a multimedia device configured for controlling navigation and the vehicle air conditioning, and may communicate with an external network for real-time traffic information and connection with a user's smartphone.

The telematics device may provide a variety of remote services such as the vehicle diagnosis by interworking with a telematics center via the external network.

The V2X may mean any type of communication technology applicable to a vehicle on a road and may include vehicle-to-vehicle (V2V) communication, vehicle-to-infrastructure (V2I) communication, and vehicle-to-nomadic devices (V2N) communication.

The V2X may support communication to implement advanced driver assistance systems (ADAS) and a connected vehicle for autonomous driving.

The second communication module 112 may include a wireless on-board diagnostic system (OBD) and may support short-range wireless communication between an in-vehicle network and the inspector 200.

The wireless OBD may be a communication device that connects a wireless diagnostic communication with the inspector 200 to support a security inspection of the vehicle, and may transmit a wireless signal using a unique OBD ID.

That is, the second communication module 112 may connect a diagnostic communication such as a controller area network (CAN), a local interconnect network (LIN), a FlexRay network, and an Ethernet network in the vehicle with the inspector 200.

The external gateway 120 may transfer data, which are transmitted to an outside network or received from the outside thereof network, to the internal gateway 130.

The internal gateway 130 may transmit information transmitted from the external gateway 120 to an electronic control unit (ECU) (or an electronic control device) through an internal network or may support communication between various electronic control devices.

The external gateway 120 and the internal gateway 130 may be communication gateways connecting the external network of the vehicle and the internal network of the vehicle, and may be applied a communication security technique according to installation of a firewall.

For example, an application firewall (AFW) optimized for vehicle communication protocol may be disposed in the external gateway 120 and the internal gateway 130.

The firewall may be an authentication means using a public key infrastructure (PKI), and may authenticate the other party based on a certificate. The firewall may block transmission of harmful information which is unauthenticated and may provide an alarm regarding the transmission of the harmful information.

The encryption module 140 may encrypt data transmitted and received between the ECUs in the internal network through an encryption key so that the transmission/reception data is confirmed only in the ECUs interlocked with each other.

The key management module (or a KMS device) 150 may define logic and rule for encrypting and decrypting data transmitted and received at each communication node to securely maintain an overall vehicle communication system, may generate an encryption key according to the rule, and may provide the encryption key to each of the communication nodes.

To the present end, the KMS device 150 may perform access control and authority management such as generation/destruction of an encryption/decryption key for inter-ECU communication in the vehicle internal network.

In other words, the KMS device 150 may manage the generation and the destruction of the encryption key including the certificate used by the firewall of the external gateway 120 and the internal gateway 130 and the encryption module 140.

Figure 3:
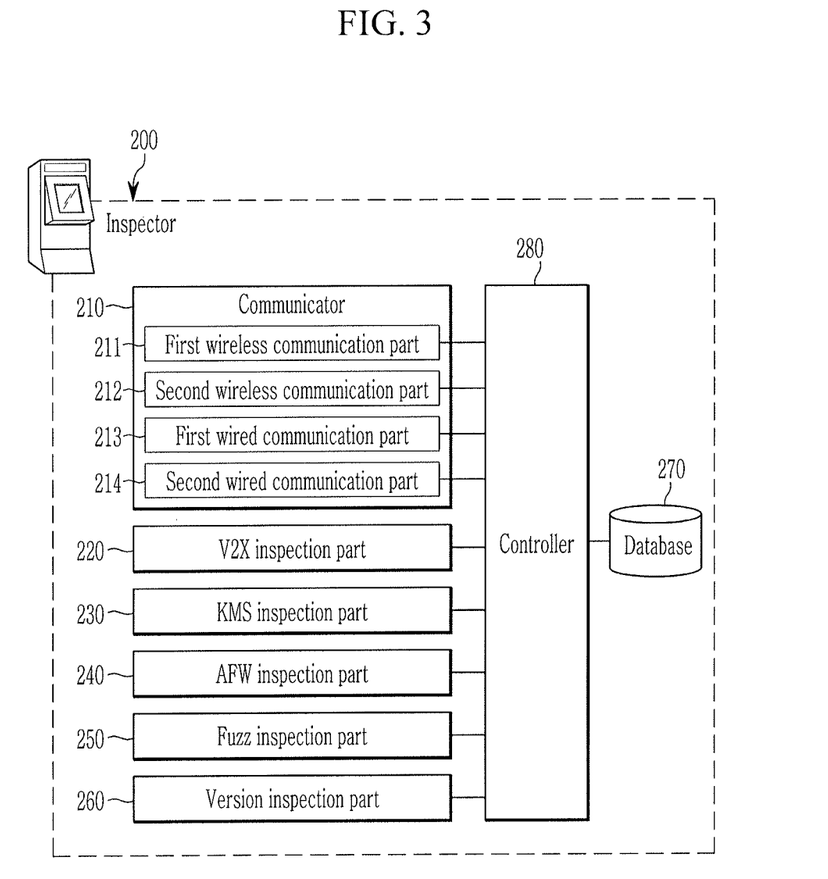
FIG. 3 is a block diagram schematically showing a configuration of an inspector according to an exemplary embodiment of the present invention.

FIG. 3 is a block diagram schematically showing a configuration of the inspector according to an exemplary embodiment of the present invention.

Referring to FIG. 3, the inspector 200 may include a communicator 210, a V2X inspection portion 220, a KMS inspection portion 230, an AFW inspection portion 240, a fuzz inspection portion 250, a version inspection portion 260, a database (DB) 270, and a controller 280.

The communicator 210 may collect information for the vehicle security inspection through wired and wireless communication, and may include a first wireless communication portion 211, a second wireless communication portion 212, a first wired communication portion 213, and a second wired communication portion 214.

The first wireless communication portion 211 may connect the first diagnostic communication with the first communication module 111 of the vehicle through the external network, and may, for example, include a wireless interface for telematics communication.

The second wireless communication portion 212 may connect the second diagnostic communication with the OBD of the second communication module 112, and may include a wireless interface for communicating with the OBD.

The first wired communication portion 213 may collect the vehicle identification number VIN according to reading a barcode of the vehicle entering the inspection process by the scanner (or a barcode scanner) connected to the inspector 200 via serial communication.

The second wired communication portion 214 may inquire the vehicle type (or the vehicle specification) corresponding to the vehicle identification number VIN in the DB of the Manufacturing Execution System (MES) connected to the inspector 200 via a network.

The MES may match and manage the VIN, sequence information, and the OBD information related to the vehicle mounted on the conveyor in order, and may control process status of an entire production line of the vehicle.

Therefore, the second wired communication portion 214 may further acquire the OBD ID mounted on the vehicle. The second wireless communication portion 212 may connect a wireless communication through pairing with the OBD of the vehicle using the OBD ID.

The V2X inspection portion 220 may transmit a test message for the V2X of the vehicle through the first diagnostic communication (i.e., the external network) to detect whether encryption and decryption messages are normal.

The V2X inspection portion 220 may analyze the test message of the V2X to diagnose an error which is wrongly translated into abnormal data during encryption or decryption.

The KMS inspection portion 230 may inspect whether the KMS device 150 of the vehicle normally encrypts and decrypts data according to a defined rule.

The AFW inspection portion 240 may inspect whether security policy of the AFW is normally disposed and a link between the firewall and the gateway is normally verified or performed. For example, the AFW security policy may mean a vehicle communication security standard IEEE 1609.2/CAMP VSC3-based design which is a future vehicle security standard.

The AFW inspection portion 240 may diagnose whether the firewall AFW of each of the gateways is normally activated.

The AFW inspection portion 240 may inspect whether the firewall AFW properly analyzes and blocks abnormal data which is introduced from the outside thereof network and is communicated within the internal network. The AFW inspection portion 240 may inspect whether an intrusion detection function of an intrusion detection system (IDS) and an intrusion prevention system (IPS) for the firewall AFW is normally operated.

The fuzz inspection portion 250 may monitor the V2X operation state of the vehicle by transmitting random abnormal data (or random abnormal packet) instead of a predetermined logic through the first diagnostic communication using the external network, and may inspect occurrence of an error such as stop or temporary stop of execution of an application.

According to a fuzz test performed by the fuzz inspection portion 250, the abnormal data which is received while the vehicle is traveling on a real road may be received via the V2X, performance against malicious hacking attack may be verified, or unexpected security vulnerability (e.g., a log defect or a bug) may be detected.

The version inspection portion 260 may update a patch program and a firmware of the security system when a type of the vehicle is updated.

The database 270 may store a program and data for operation of the inspector 200 and may store data generated according to the operation.

The DB 270 may register and manage coverage of the security system according to the vehicle type, link information between the firewall and the gateway, encryption rule information related to the KMS, environment setting information related to the KMS, and the ECU firmware version information.

The controller 280 may be a central processing unit for the vehicle security inspection according to an exemplary embodiment of the present invention, and may control an overall operation of elements of the inspector 200 using a main program stored in a memory.

The controller 280 may confirm a type of the vehicle entering the vehicle security process to connect the wireless communication, and may perform a diagnostic test to confirm whether the security system (i.e., security means) applied to the vehicle type is normally operated.

The controller 280 may distinguish between the vehicle corresponding to the security verification success and the vehicle corresponding to the security verification failure based on the diagnostic test result to provide an alarm regarding the distinction result, and may diagnose a cause of the security verification failure by analyzing log information related to the diagnostic test.

The controller 280 may be explained in detail through a vehicle security inspection method according to an exemplary embodiment of the present invention to be described later.

The vehicle security inspection method will be described based on the configuration of the above described vehicle security system. However, since the configuration of the inspector 200 is subdivided or integrated according to a function, the inspector will be referred to as the subject or a main agent performing the vehicle security inspection method.

Figure 4A:
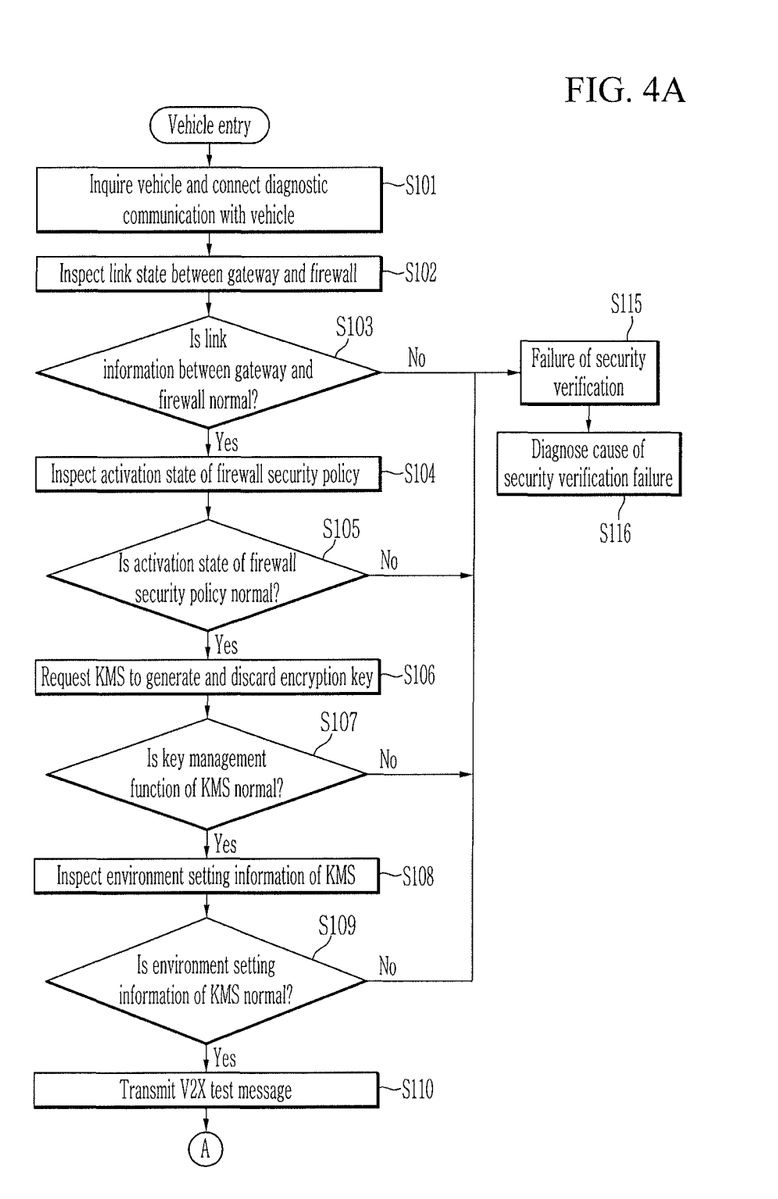
FIG. 4A and FIG. 4B are flowcharts schematically illustrating a vehicle security inspection method according to an exemplary embodiment of the present invention.
Figure 4B:
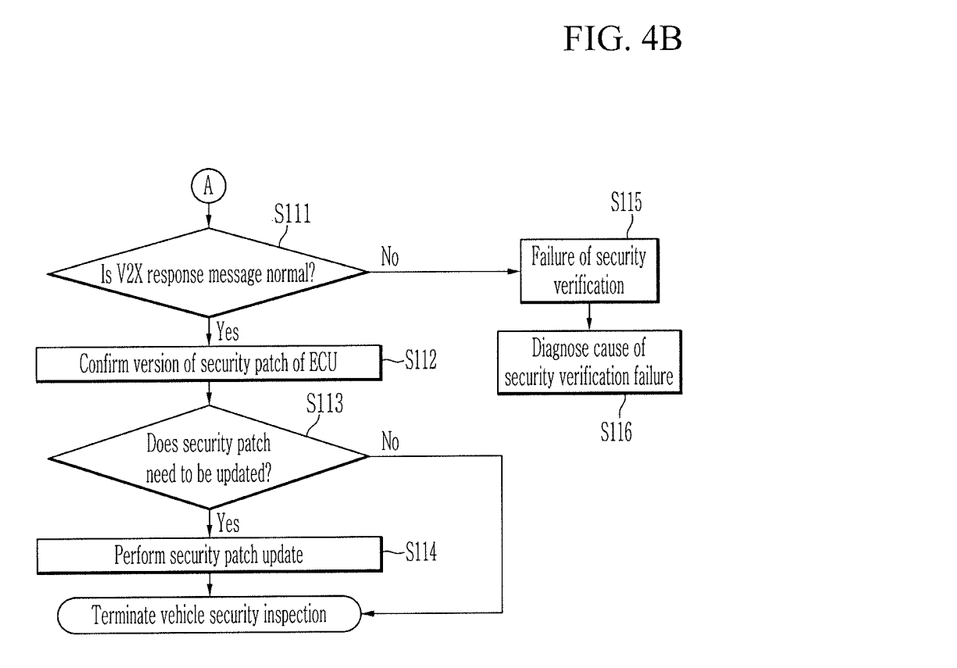

FIG. 4A and FIG. 4B are a flowchart schematically illustrating the vehicle security inspection method according to an exemplary embodiment of the present invention.

Referring to FIG. 4A and FIG. 4B, the inspector 200 may recognize the vehicle entry when the VIN according to reading the barcode by the scanner is input, and may start the security inspection process based on a type of the recognized vehicle.

According to a step S101, the inspector 200 may inquire the vehicle type information corresponding to the vehicle identification number VIN and the OBD ID mounted on the vehicle 100 of the MES in a response to the vehicle entry, and may connect the wireless diagnostic communication with the vehicle. The inspector 200 may connect the first diagnostic communication through the external network using the telematics (TMS) communication and may connect the second diagnostic communication with the OBD.

According to a step S102, the inspector 200 may inspect a link state between the gateway and the firewall AFW of the vehicle through the diagnostic communication. The inspector 200 may inspect whether the link information between the gateway and the firewall, which are a wireless communication gateway of the vehicle, is normally verified.

When the link information between the gateway and the firewall is determined to be normal (Yes in step S103), the inspector 200 may inspect whether the security policy set in the firewall (AFW) matches security policy of the DB 270 according to the vehicle type and the security policy of the firewall is activated (step S104).

The inspector 200 may request the KMS of the vehicle to generate and destruct the encryption key (step S106) when the security policy state information and the activation of the firewall AFW are determined to be normal (step S105).

When the inspector 200 receives the encryption key generation and destruction response message of the KMS from the vehicle in a response to the request so that key management function of the KMS is determined to be normal (step S107), the inspector 200 may inspect environment setting information related to the KMS (step S108).

The inspector 200 may determine or verify whether at least one environment setting information among the key generation/destruction cycle, access control, and management authority of the KMS matches the information related to the DB 270 according to the vehicle type.

When the environment setting information related to the KMS is determined to be normal (step S109), the inspector 200 may inspect encryption and decryption performance of the V2X communication by transmitting the V2X test message through the first diagnostic communication (step S110). The inspector 200 may analyze a response message according to the test message and may diagnose an error which is incorrectly translated into abnormal data during the encryption or decryption process.

When the V2X response message of the vehicle is determined to be normal (step S111), the inspector 200 may check or confirm whether security patches and firmware of the various ECUs and security means in the vehicle are a latest version, and may determine whether an update of the security patches and the firmware is necessary (step S112).

The inspector 200 may terminate the vehicle security inspection when the update of the security patches and the firmware is determined to be unnecessary (No in step S113).

When the update of the security patches or the firmware is determined to be necessary (step S113), the inspector 200 may perform the security patch update or the firmware update through the wireless diagnostic communication (step S114).

The inspector 200 may terminate the vehicle security inspection when the update is completed.

When the determination results in the steps S103, S105, S107, S109, and S111 are not normal, the inspector 200 may determine that the vehicle security verification has failed (step S115). The inspector 200 may store the verification failure log record and may provide an alarm regarding the verification failure to an operator of the system.

The inspector 200 may analyze the log record to diagnose a cause of the security verification failure and may present a solution thereof (step S116).

A vehicle that solves the security verification failure problem may re-enter the security inspection process line to be inspected again.

Figure 5:
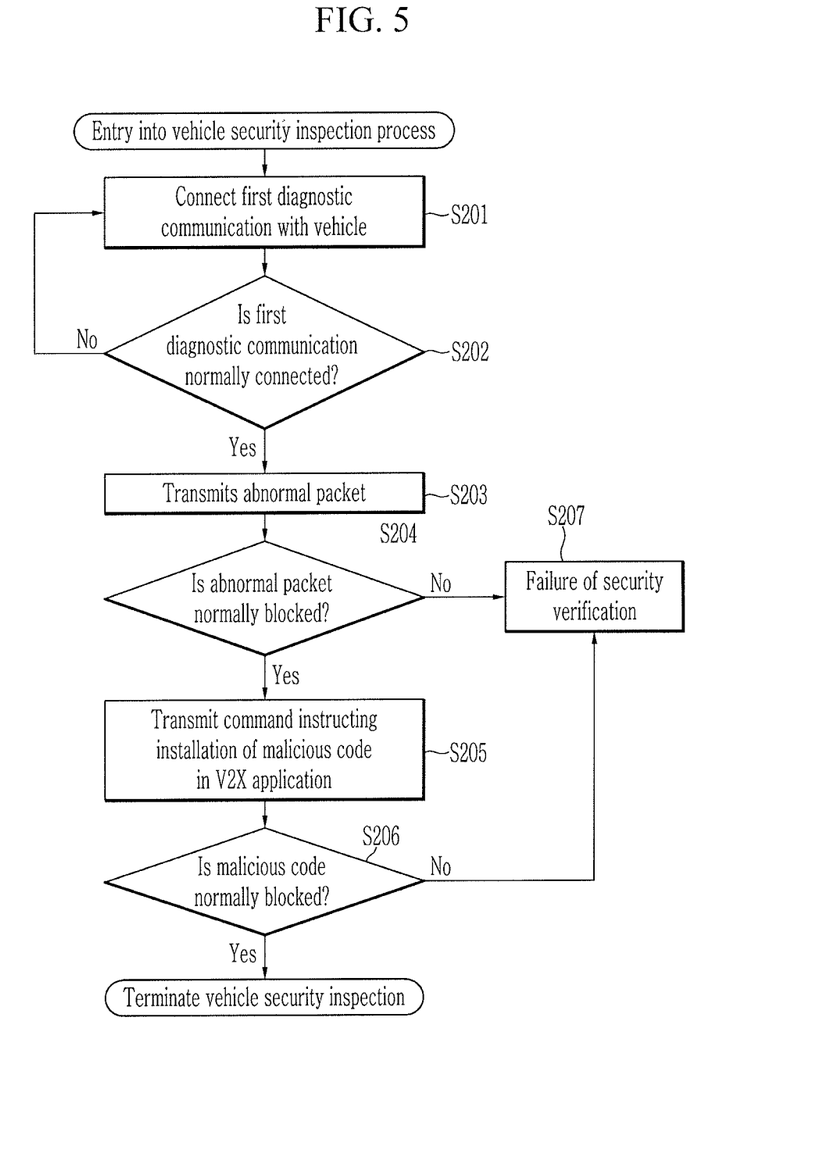
FIG. 5 is a flowchart illustrating a fuzz testing method in the vehicle security inspection method according to an exemplary embodiment of the present invention.

FIG. 5 is a flowchart illustrating a fuzz testing method in the vehicle security inspection method according to an exemplary embodiment of the present invention.

Referring to FIG. 5, the inspector 200 may connect the first diagnostic communication with the vehicle through the external network using the telematics (TMS) communication when the inspector recognizes the vehicle entry as described with reference to FIG. 4 (step S201).

The inspector 200 may transmit a random abnormal communication packet instead of predetermined logic through the first diagnostic communication (step S203) when the first diagnostic communication is normally connected (step S202).

The abnormal packet may be randomly generated through a random number combination, and may be generated with reference to a recently discovered attack pattern according to a hacking issue of the vehicle.

When the inspector 200 monitors an operation state of the V2X device and receives from the vehicle a response message indicating that the abnormal packet is normally blocked (step S204), the inspector may transmit to the vehicle a hacking command instructing forced installation of a malicious code in the V2X application (step S205).

The malicious code may be generated by referring to a malicious code that has recently been discovered according to a hacking issue of the vehicle.

When the inspector 200 receives a response message, which indicates that the malicious code has been normally blocked, from the vehicle (step S206), the inspector 200 may determine that the fuzz test is successful so that it ends the inspection.

When a response message that the abnormal packet and the malicious code are not normally blocked is received in the steps S204 and S206, the inspector may determine that the security verification has failed so that it stores the verification failure log record and provides an alarm regarding the verification failure to the operator of the system (step S207).

The inspector 200 may diagnose a cause of the security verification failure and may perform the security vulnerability review so that it generates a patch program and distributes the patch program to the vehicle.

The above fuzz test may be added when the vehicle security inspection was performed, and it is obvious that the fuzz test will be combined with the vehicle security inspection method of FIG. 4.

Figure 6:
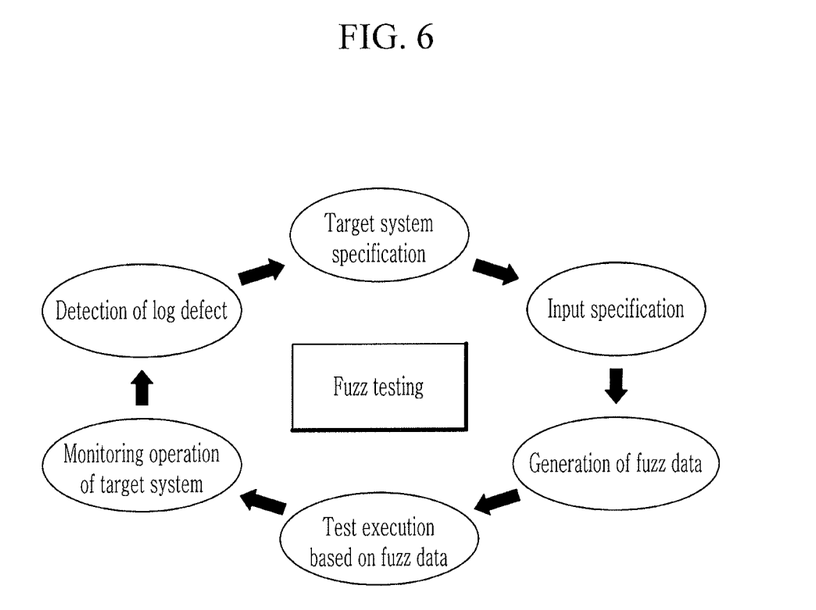
FIG. 6 is a conceptual diagram for explaining the fuzz testing according to an exemplary embodiment of the present invention.

FIG. 6 is a conceptual diagram for explaining the fuzz testing according to an exemplary embodiment of the present invention.

Figure 7:
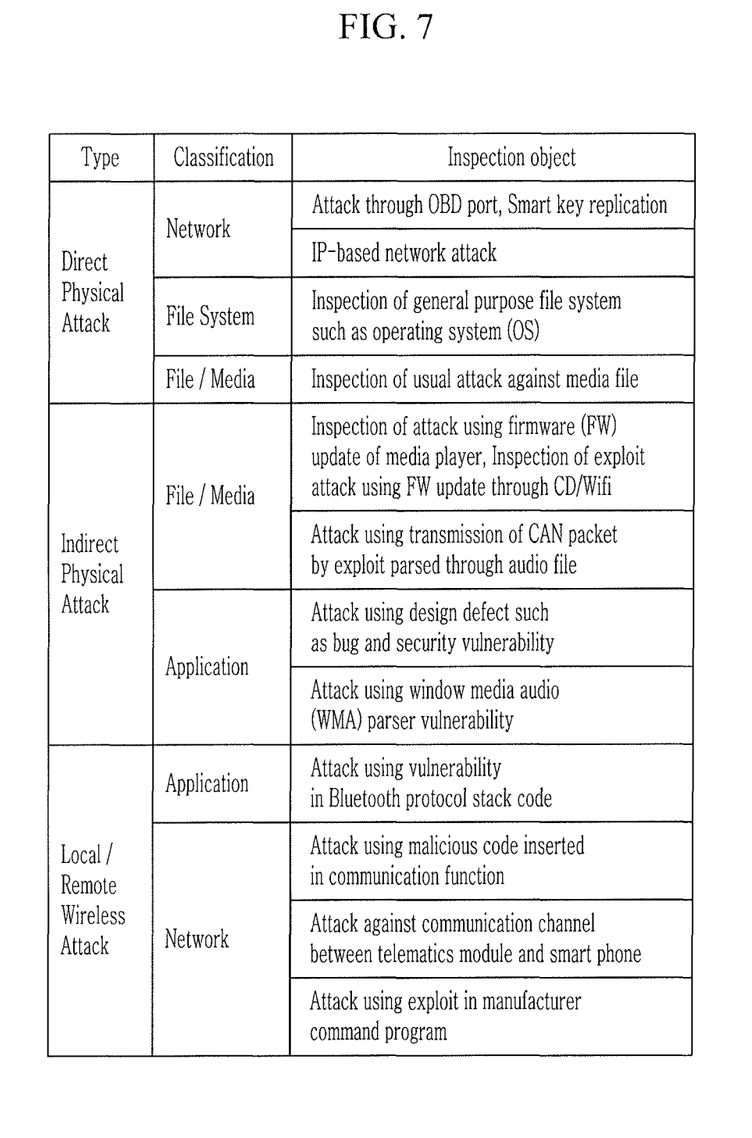
FIG. 7 is a table showing an object which is performed by the fuzz testing of the vehicle according to an exemplary embodiment of the present invention.

FIG. 7 is a table showing an object which is performed by the fuzz testing of the vehicle according to an exemplary embodiment of the present invention.

Referring to FIG. 6 and FIG. 7, the inspector 200 may detect security vulnerability by inputting abnormal data in a security application of the vehicle through the fuzz testing.

The fuzz testing may define the inspection object of the vehicle as a target security system, and may transmit fuzz data (or fuzz packets) to the defined target system to execute a fuzz test. A process of detecting a log defect may be repeated by monitoring an operation of the target system.

For example, as shown in FIG. 7, it is possible to perform the fuzz test on various inspection objects that includes a direct physical attack, an indirect physical attack, and a local/remote wireless attack against the vehicle and to compensate security vulnerability thereof.

The fuzz testing may be performed for verification when security technology is applied to the vehicle, but an exemplary embodiment of the present invention is not limited to this, and the fuzz testing may be performed in a security inspection process of a mass production vehicle.

The exemplary embodiment of the present invention may detect security vulnerability or a bug through the fuzz test on an actual vehicle and may support wireless update using the TMS communication to solve a problem that an object and a scope of a hacking attack against the V2X communication are increased as the vehicle evolves into a connected car. Thus, a customer's reliability on the vehicle security may be improved.

So far, the exemplary embodiments of the present invention have been described, but the scope of the present invention is not limited thereto and may be variously modified.

The exemplary embodiment of the present invention, which is the vehicle security inspection system, may verify various security core technologies applied to or expected to be applied to the vehicle to improve reliability and safety of the vehicle.

The exemplary embodiment of the present invention may improve security quality of the vehicle (e.g., a connected vehicle that utilizes various communication infrastructures) to cope with regulations regarding a vehicle security specification in a global market.

Furthermore, the exemplary embodiment of the present invention may reduce a replacement cost, a software improvement cost, and a firmware update cost of the ECU, the KMS, the AVN device caused by a security problem of the vehicle.

Although the exemplary embodiment of the present invention has been described assuming that the electronic equipment is the vehicle, the present invention is not limited thereto and various other modifications are possible.

For example, the electronic equipment may include a ship, a train, a bike, an electric bicycle, a drone, a home appliance, a home gateway, and infrastructure equipment, to which internet of things (IoT) communication and/or information communication technology (ICT) are applied to and a communication security system for preventing hacking is applied to.

The exemplary embodiment of the present invention is not implemented by the aforementioned apparatus and/or method, and may be implemented by a program for operating a function corresponding to the configuration of the exemplary embodiment of the present invention, a recording medium in which the program is recorded, and the like, and the implementation may be easily realized from the description of the aforementioned exemplary embodiment of the present invention by those skilled in the art.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A security inspection system that verifies security performance of a security system applied to an electronic equipment, including an inspector, wherein the inspector comprises:
    a communicator configured to connect wireless diagnostic communication with the electronic equipment entered into a process line;
    a key management system inspection portion configured to inspect a management state of generation and destruction of encryption key of a key management system device included in the electronic equipment;
    an application firewall inspection portion configured to inspect security policy of an application firewall installed in a gateway of the electronic equipment;
    a version inspection portion configured to update at least one of a patch program and a firmware of the security system included in the electronic equipment;
    a database configured to store a program and data for a security inspection of the electronic equipment; and
    a controller configured to control an operation of the communicator, the key management system inspection portion, the application firewall inspection portion, the version inspection portion, and the database so that the controller performs at least one diagnostic test of a firewall installation state, an encryption key management state, a transmission/reception state of an encrypted message, and blocking of abnormal data of the security system included in the electronic equipment.

2. The security inspection system of claim 1, wherein the electronic equipment includes a vehicle to which the security system is applied, and wherein the vehicle includes:
    a first communication module configured to connect wireless communication between the inspector and a vehicle head device via an external network;
    a second communication module configured to connect short-range wireless communication with the inspector using an on-board diagnostic system;
    an external gateway including the application firewall and configured to transmit and receive data through the first communication module and the second communication module;
    an internal gateway including the application firewall and configured to transfer information transmitted from the external gateway to electronic controllers connected to an internal network of the vehicle;
    an encryption module configured to encrypt data transmitted and received between the electronic controllers in the internal network; and
    the key management system device configured to define rule for encrypting and decrypting the data transmitted and received between the electronic controllers and to manage generation and destruction of the encryption key for communication between the electronic controllers.

3. The security inspection system of claim 1, wherein the communicator includes:
    a first wireless communication portion configured to connect first diagnostic communication with a vehicle which is the electronic equipment via an external network; and
    a second wireless communication portion configured to connect second diagnostic communication with an on-board diagnostic device of the vehicle.

4. The security inspection system of claim 3, wherein the inspector further includes:
    a vehicle-to-everything inspection portion configured to inspect a state of encryption of a test message for a vehicle-to-everything device of the vehicle through the first diagnostic communication; and
    a fuzz inspection portion configured to monitor an operation state of the vehicle-to-everything device by transmitting random abnormal data to the vehicle through the first diagnostic communication.

5. The security inspection system of claim 4, wherein the vehicle-to-everything inspection portion analyzes the test message to diagnose an error which is incorrectly translated into abnormal data during encryption or decryption.

6. The security inspection system of claim 4, wherein the application firewall inspection portion inspects when a link between the application firewall and the gateway is normally performed.

7. The security inspection system of claim 4, wherein the database registers and manages coverage of the security system according to a vehicle type, link information between the application firewall and the gateway, encryption rule information and environment setting information related to the key management system device, and firmware version information related to an electronic controller of the vehicle.

8. The security inspection system of claim 4, wherein the controller is configured to identify that a malicious code included in the abnormal data is normally blocked when the controller receives a response message indicating that the malicious code is normally blocked after transmitting a hacking command instructing forced installation of the malicious code in an application of the vehicle-to-everything device.

9. The security inspection system of claim 4, wherein, when one of inspection of the vehicle security system fails to verify security, the controller analyzes failed log information to diagnose a cause of security verification failure.

10. The security inspection system of claim 1, wherein the controller is configured to identify that the encryption key management state is normal when the controller receives an encryption key generation and destruction response message of the key management system device from the electronic equipment in a response to a request for the encryption key generation and destruction performed by the controller.

11. A security inspection method of an inspector that verifies security performance of a security system applied to an electronic equipment, comprising:
   a) recognizing, by the inspector, the electronic equipment entering a security inspection process line and connecting wireless diagnostic communication with the electronic equipment;
   b) diagnosing, by the inspector, performance of the security system of the electronic equipment by inspecting at least one of a firewall installation state, an encryption key management state, a transmission/reception state of an encrypted message, and blocking of abnormal data of the electronic equipment through the wireless diagnostic communication;
   c) confirming, by the inspector, a version of a security patch and a firmware of the security system and updating to a latest version; and
   d) when one of the inspection fails in security verification, storing, by the inspector, verification failure log record and providing an alarm regarding the verification failure to an operator of the security system.

12. The security inspection method of claim 11, wherein step a) includes:
   connecting, by the inspector, first diagnostic communication with a vehicle which is the electronic equipment using a first wireless communication portion through an external network; and
   connecting, by the inspector, second diagnostic communication with an on-board diagnostic device mounted on the vehicle using a second wireless communication portion.

13. The security inspection method of claim 11, wherein step b) includes:
   inspecting, by the inspector, when link information between a gateway and a firewall of a vehicle which is the electronic equipment is normally verified.

14. The security inspection method of claim 13, wherein step b) further includes:
   inspecting, by the inspector, when security policy set in the firewall matches security policy of a database of the inspector according to a vehicle type, and activating security policy of the firewall.

15. The security inspection method of claim 13, wherein step b) further includes:
   determining, by the inspector, that the encryption key management state is normal when the inspector receives an encryption key generation and destruction response message of the key management system device of the vehicle in a response to a request for the encryption key generation and destruction performed by the inspector.

16. The security inspection method of claim 15, wherein step b) further includes:
   verifying, by the inspector, when at least one environment setting information among key generation and destruction cycle, access control, and management authority of the key management system device matches the information related to a database of the inspector according to a vehicle type.

17. The security inspection method of claim 13, wherein step b) further includes:
   transmitting, by the inspector, a test message for a vehicle-to-everything device of the vehicle through second diagnostic communication connected to an external network; and
   analyzing, by the inspector, the test message of the vehicle-to-everything device to diagnose an error which is incorrectly translated into abnormal data during encryption or decryption.

18. The security inspection method of claim 13, wherein step b) further includes:
   transmitting, by the inspector, abnormal data which is randomly generated through a random number combination through second diagnostic communication connected to an external network; and
   performing, by the inspector, a fuzz testing step of verifying when a response message indicating that the abnormal data is normally blocked is received from the vehicle.

19. The security inspection method of claim 18, wherein the fuzz testing step includes:
   transmitting, by the inspector, a hacking command instructing forced installation of a malicious code in an application of a vehicle-to-everything device of the vehicle; and
   determining, by the inspector, that the malicious code is normally blocked when the inspector receives a response message indicating that the malicious code is normally blocked.

* * * * *